United States Patent
Nerone et al.

(10) Patent No.: US 6,479,949 B1
(45) Date of Patent: Nov. 12, 2002

(54) POWER REGULATION CIRCUIT FOR HIGH FREQUENCY ELECTRONIC BALLAST FOR CERAMIC METAL HALIDE LAMP

(75) Inventors: Louis R. Nerone, Brecksville, OH (US); Weizhong Tang, Willoughby, OH (US); Van Anh N. Nguyen, South Euclid, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/591,280

(22) Filed: Jun. 9, 2000

Related U.S. Application Data (63) Continuation-in-part of application No. 09/496,094, filed on Feb. 1, 2000.

(51) Int. Cl.$^7$ ............................................... H05B 37/02
(52) U.S. Cl. ........................ 315/291; 315/224; 315/276
(58) Field of Search ................................ 315/307, 291, 315/224, 225, 209 R, DIG. 7, 219, 244, 277, 276

(56) References Cited

U.S. PATENT DOCUMENTS

| | | | | |
|---|---|---|---|---|
| 4,819,146 A | * | 4/1989 | Nilssen | 315/DIG. 7 |
| 5,381,076 A | | 1/1995 | Nerone | 315/209 R |
| 5,612,594 A | | 3/1997 | Maheshwari | 315/224 |
| 5,710,489 A | * | 1/1998 | Nilssen | 315/291 |
| 5,917,289 A | | 6/1999 | Nerone | 315/209 R |
| 6,181,076 B1 | * | 1/2001 | Trestman | 315/224 |

FOREIGN PATENT DOCUMENTS

| | | |
|---|---|---|
| EP | 0 905 052 A1 | 12/1993 |
| EP | 0 765 108 A2 | 3/1997 |

\* cited by examiner

*Primary Examiner*—David Vu
*Assistant Examiner*—Wilson Lee (57) ABSTRACT

An electronic ballast for igniting and maintaining a discharge arc in a discharge tube of a ceramic metal halide lamp wherein a resistance of the discharge tube varies with a temperature of the discharge tube during operation. It is desirable to energize the discharge tube with a substantially constant value to prevent changes in color of the light emitted by the discharge tube that result from changes to the power applied to the discharge tube. The ballast includes ballast circuitry having an inverter circuit driving an LC tank network coupled to the discharge tube. The LC tank network applies a time varying voltage to the discharge tube wherein a peak-to-peak magnitude of the time varying voltage applied by the LC tank network is determined by a frequency of oscillation of the inverter circuit. The ballast circuitry further includes power regulation circuitry inductively coupled to the inverter circuit to vary the frequency of oscillation of the inverter circuit such that power applied to the discharge tube remains within a predetermined desired range while discharge tube resistance varies during operation. The power regulation circuitry includes an operational amplifier configured as a error amplifier. The operational amplifier compares a voltage drop across a sensor resistor in the inverter circuit with a set point reference voltage. The voltage drop across the sensor is proportional to a current through the discharge tube. When the voltage drop across the sensor resistor changes from the set point reference voltage because of changing resistance of the discharge tube, the output of the operational amplifier accordingly changes thereby changing a current though a secondary winding of a transformer. The transformer primary winding is coupled to the inverter circuit and changes a frequency of oscillation of the inverter circuit depending on the secondary winding current.

23 Claims, 4 Drawing Sheets

POWER REGULATION CIRCUIT FOR HIGH FREQUENCY ELECTRONIC BALLAST FOR CERAMIC METAL HALIDE LAMP

RELATED APPLICATION

This application is a continuation-in-part of U.S. patent application Ser. No. 09/496,094, filed on Feb. 1, 2000 and assigned to the assignee of the this application. U.S. patent application Ser. No. 09/496,094 is incorporated herein in its entirety by reference.

FIELD OF THE INVENTION

This invention relates generally to power control circuitry for an electronic ballast suitable for igniting a ceramic metal halide lamp and, more particularly, to an electronic ballast that utilizes power control circuitry to provide substantially constant power to a ceramic metal halide lamp regardless of the resistance of the lamp.

BACKGROUND ART

Ceramic metal halide (CMH) lamps provide several advantages over conventional metal halide lamps including a more uniform color spectrum. A CMH lamp includes a discharge tube defining an interior region. Upon application of sufficient voltage across a pair of electrodes positioned within the interior region of the discharge tube, a high pressure arc is ignited in the discharge tube interior region.

It is highly desirable that the power input to a CMH lamp operating under steady state conditions be maintained at a substantially constant value because the color of light emitted by the lamp is dependent on the power input to the lamp. As a CMH lamp heats up during operation, the resistance of the lamp decreases. Assuming a constant source voltage, the current through the lamp increases with decreasing lamp resistance. Thus, power input to the lamp would increase as the lamp heats up and the color of the light emitted by the lamp would undesirably shift or change.

Control of power input to CMH lamps is also important because CMH lamps have different resistance values due to variations inherent in the manufacturing process. Additionally, as a CMH lamp ages its resistance value increases. Thus, by accurately controlling power input to a CMH lamp is possible to avoid color shifting during operation and to have uniformity of emitted light color when a number of CMH lamps are used to illuminate an room or other area.

SUMMARY OF THE INVENTION

The present invention is directed to power regulation circuitry for an electronic ballast for igniting and maintaining an arc within a discharge tube of a ceramic metal halide (CMH) lamp. In a first embodiment of the present invention, the electronic ballast includes an inverter circuit for providing power to a CMH lamp and power regulation circuitry coupled to the inverter circuit to maintain substantially constant power to the lamp in spite of changes in the lamp resistance during operation.

The power regulation circuitry includes an operational amplifier configured as an integrating error amplifier, a pair of p channel MOSFET control transistors, a secondary winding coupled between the control transistors, a low pass filter, a integrating capacitor coupled in a feedback loop of the operational amplifier, and a sensor resistor coupled in series with one of a pair of complementary MOSFET transistors of the inverter circuit.

As the resistance of the lamp changes, the current through the sensor resistor and the voltage across the sensor resistor both change. The voltage across the sensor resistor is coupled to one input terminal (inverting input terminal) of the operational amplifier. A set point voltage is input to the other terminal (noninverting input terminal) of the operational amplifier. A set point voltage is selected such that a desired power is applied to the lamp. The set point voltage is derived from a reference voltage taken from the inverter circuit. The reference voltage is attenuated by an attenuator or divider circuit to generate the desired set point voltage.

The output of the operational amplifier is proportional to the voltage difference between two input terminals and is coupled to respective gate terminals of complementary MOSFET control transistors. A secondary winding is coupled between the drain terminals of the MOSFET control transistors. The secondary winding is inductively coupled to a primary winding in the inverter circuit. If the resistance of the lamp changes, for example, decreases as the lamp heats up, the current though the lamp and the sensor resistor will increase and the magnitude of the voltage difference the input terminals of the operational amplifier will increase.

If the voltage difference between the operational amplifier input terminals is of sufficient magnitude, the MOSFET control transistors will be turned on, shunting current away from the secondary winding and by inductive coupling reducing current through the inverter circuit primary winding. Reducing current through the inverter circuit primary winding increases the switching frequency of the inverter circuit. The inverter circuit, in turn, excites or drives an LC tank network coupled to the lamp. Increasing the frequency of the inverter circuit drives the LC tank network at a frequency further above the LC tank network resonant frequency and thereby decreases the voltage applied across the lamp by the LC tank network. Thus, as lamp current increase, lamp voltage decreases such that lamp power remains substantially the same.

In a second embodiment of the present invention, the power regulation circuitry further includes an inverting operational amplifier to insure that the set point voltage is maintained at the desired magnitude even if the DC bus voltage fluctuates because of fluctuations in the AC power line voltage. Without the inverting operational amplifier, changes in the DC bus voltage will cause corresponding changes in the reference voltage which, in turn, will cause the set point voltage to change. Recall that the set point voltage determines the power applied to the lamp. The output voltage of the inverting operational amplifier is used as the set point input voltage coupled to the noninverting input of the integrating error amplifier. The remainder of the power regulation circuitry is identical to the first embodiment.

These and other objects, advantages, and features of an exemplary embodiment of the present invention are described in detail in conjunction with the accompanying drawings.

DETAILED DESCRIPTION OF THE EXEMPLARY EMBODIMENT OF THE INVENTION

Figure 1:
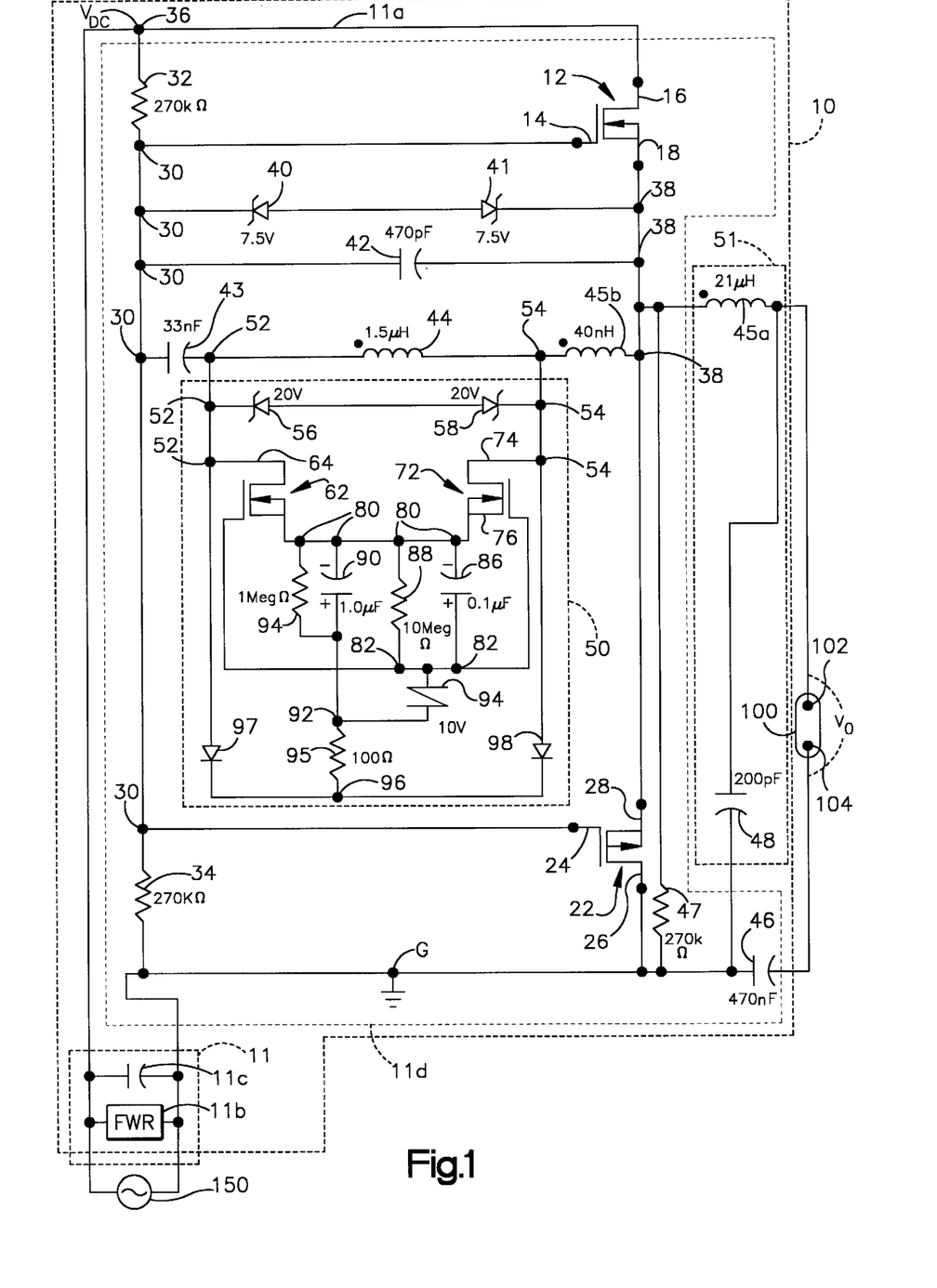
FIG. 1 is a circuit diagram of a first preferred embodiment of an electronic ballast of the present invention.

A first preferred embodiment of an electronic ballast of the present invention is shown generally at 10 in FIG. 1. The electronic ballast 10 is used for igniting and maintaining an arc in a discharge tube of a ceramic metal halide (CMH) lamp. The discharge tube is shown schematically at 100 in FIG. 1. A spaced apart pair of electrodes 102, 104 extend into the interior region of the discharge tube 100. Upon application of a sufficient voltage potential difference across the electrodes 102, 104, a high pressure discharge arc is ignited within the discharge tube interior region. The ballast 10 is essentially an AC to AC converter that converts AC power line at 120V and 60 Hz to an AC voltage and frequency suitable for igniting an arc in the discharge tube 100, e.g., 2.0 kV at 2.46 MHz, and, after ignition of the arc, to a voltage and frequency suitable for maintaining the arc in the discharge tube 100, e.g., 50 V RMS at 2.65 MHz if the discharge tube 100 is relatively cool and 2.6 MHz if the discharge tube is relatively hot (lamp has been operating). To initiate the arc in the discharge tube 110, the ballast 10 generates a periodic series of voltage pulses which are applied across the CMH discharge tube electrodes 102, 104. The series of voltage pulses are shown generally at 200 in FIG. 2 and a single voltage pulse 200a of the series of voltages pulse is shown in FIG. 3.

The ballast 10 includes rectification circuitry 11 to convert the AC 120 V power line voltage source 150 into a 160 V DC bus voltage present on the DC bus line 11a (labeled as $V_{DC}$ at node 36). The rectification circuitry 11 includes a full wave bridge rectifier 11b of conventional design and an electrolytic capacitor 11c. The ballast further includes an inverter circuit 11d for converting the 160 V DC bus line voltage, $V_{DC}$, to an AC voltage suitable to: a) ignite an arc in the discharge tube 100; and b) maintain the discharge tube arc after ignition of the arc.

Advantageously, the ballast 10 which includes a hot restart protection circuit 50 excites a resonant LC tank network 51 (to be described below and which is shown in FIG. 1) to provide a pulsed output voltage, Vo, (FIG. 2) applied to the CMH lamp discharge tube 100 to ignite discharge in the tube. The time between pulses is sufficient to allow cooling of the discharge tube 100 between applications of the voltage pulses (the voltage pulses being labeled as 200a, 200b, 200c, 200d, 200e, 200f and generally as 200 in FIG. 2). Further, the hot restart protection circuit 50 limits the amplitude of the applied voltage pulses to a peak voltage of 2.0–2.5 kV (4.0–5.0 kV peak to peak) to avoid damage to circuitry components. Finally, the frequency of the pulse train comprising each output voltage pulse 200 is 2.46 MHz corresponding to the resonant frequency of the LC tank network 51.

It should be appreciated that while the preferred embodiment of the ballast 10 described below is suitable for use in conjunction with a 120 V AC voltage source 200, a 230 V AC voltage source could also be used to power the ballast 10 with appropriate changes to the circuit components of the ballast 10 to account for the higher DC voltage that would be present on the DC bus 11a. Similarly, while the ballast excites the LC tank network 51 to produce a 2.0–2.5 kV output voltage Vo at a frequency of 2.46 MHz (which is the resonant frequency of the tank network 51), it should be appreciated that other output voltage values below 5–6 kV and frequencies above 1 MHz (which is well above the first few harmonics of the discharge tube resonant frequency) would also be acceptable ballast circuit voltage output and frequency values.

In one preferred embodiment, the inverter 11d of the ballast 10 includes a pair of complementary enhancement type MOSFET transistors 12, 22. The transistor 12 is an n channel enhancement type MOSFET rated at an avalanche voltage of 250 V and the transistor 14 is an p channel enhancement type MOSFET also rated at an avalanche voltage of 250 V. The transistors 12, 22 both have their respective gate terminals 14, 24 coupled to a node 30 which is intermediate a pair of 270 kiloohm (kΩ) resistors 32, 34. The resistors 32, 34 are configured as a voltage divider coupled between the positive DC input voltage bus 36 and circuit common or ground G.

The drain terminal 16 of the MOSFET 12 is coupled to a node 36 on the positive DC input voltage bus 11a while the source terminal 18 of the MOSFET transistor 12 is coupled to the source terminal 28 of the MOSFET transistor 22. The drain terminal 26 of the MOSFET transistor 22 is coupled to circuit common or ground G. Coupled between the node 30 and a node 38 intermediate the MOSFET source terminals 18, 28 to limit voltage between the nodes 30, 38 are a pair of 7.5 V Zener diodes 40, 41 having their respective anodes coupled to clamp or limit voltage between nodes 30 and 38 to approximately +8.1 V to –8.1 V. The maximum 8.1 V magnitude results from a 7.5 V Zener breakdown voltage for the reversed biased Zener diode plus a 0.6 V diode drop across the forward biased Zener diode).

Also coupled between the nodes 30, 38 in parallel with the voltage clamping Zener diodes 40, 41 is a 470 picofarad (pF) capacitor 42. Additionally coupled between the nodes 30, 38 in parallel with the Zener diodes 40, 41 is a feed back path consisting of a 33 nanofarad (nF) capacitor 43, a 1.5 microhenry ($\mu$H) inductor 44 and a one turn 40 nanohenry (nH) tap or secondary winding 45b. The tap or secondary winding 45b is inductively coupled to a 21 $\mu$H primary winding 45a, thus a small portion (on the order of 1/35) of the current flowing through the primary winding 45a is fed back through the secondary winding 45b to make the inverter 1 id output oscillate. The hot restart protection circuit 50 is coupled across the 1.5 $\mu$H inductor 44 and is not part of the inverter circuit 11d. The Zener diodes 40, 41 and the 1.5 $\mu$H inductor 44 function to control the phase angle between the voltage that is applied to the LC tank network 51 and the responding current flowing through the primary winding 45a.

The inverter 11d further includes the resonant LC tank network 51 comprising the 21 $\mu$H primary winding 45 and a 200 pF capacitor 48 which is coupled across the CMH discharge tube 100. The resonant frequency of the LC tank network is f=½π(LC)½ or approximately 2.46 MHz. A blocking capacitor 46 (470 nF) in series with the discharge tube 100 prevents the DC component of the output voltage Vo from being applied to the discharge tube 100. Coupled between the node 38 and ground is a 270 kΩ resistor 47.

Voltage across the hot restart protection circuit 50 is limited between +20.6 V to –20.6 V by a pair of 20 V Zener diodes 56, 58 connected at their anodes and coupled between nodes 52, 54. The Zener diodes 56, 58 function to limit the amplitude of the output voltage pulses 200. For the particular Zener diode values of 20 V, the amplitude of the output voltage pulses 200 is approximately 2 kV. By appropriately changing the Zener diode values, the amplitude of the output voltage pulses 200 could be increased or decreased as desired.

The hot restart protection circuit 50 includes a pair of n channel enhancement type MOSFET switching transistors 62, 72 having their respective drain terminals 64, 74 coupled to the nodes 52, 54. Coupled in parallel to a node 80 intermediate MOSFET source terminals 66, 76 and a node 82 intermediate MOSFET gate terminals 68, 78 is an RC circuit comprising a 0.1 $\mu$F capacitor 86 and a 10 megohm (M$\Omega$) resistor 88 and having an RC time constant of 1 sec. A second RC circuit comprising a 1.0 $\mu$F capacitor 90 in series with a 100 $\Omega$ resistor 95 having an RC time constant of 100 $\mu$sec is coupled in parallel between the node 80 and a node 96.

A silicon trigger switch 94 having a break over voltage of 10 V is coupled between the node 82 and a node 92. The trigger switch 94 will conduct in either direction if the voltage amplitude across the switch, regardless of voltage polarity, exceeds the break over voltage of 10 V. A 1 M$\Omega$ resistor 94 is coupled between the node 80 and the node 92. The respective cathodes of diodes 97, 98 are also coupled to the node 96. The anode of the diode 97 is coupled to the node 52 and the anode of the diode 98 is coupled to the node 54.

Circuit Operation

1) Steady State Operation

Under steady state operating conditions of the discharge tube 100, that is, where an arc is present in the tube 100, the discharge tube 100 essentially acts as a resistive load. Under such conditions, the hot restart protection circuit 50 does not effect operation of the inverter circuit 11d. The inverter circuit 11d acts as an AC current source driving the discharge tube 100 with a current of approximately 200 milliamps (mA) resulting in an output voltage Vo of 50 V RMS voltage across the discharge tube electrodes 102, 104 and an applied power of 10–12 watts (W).

The steady state frequency of the inverter circuit 11d is approximately 2.6 MHz which is slightly higher than the resonant frequency of the LC tank network 51. Note that the resonant frequency of the LC tank network 51 is constant at about 2.46 MHz, but it is the inverter circuit 11d can excite or operate the LC tank network at frequencies other than its resonant frequency so as to decrease the voltage output Vo. Thus, it is the inverter circuit 11d that actually determines the actual frequency of the output voltage Vo. The inverter 11d drives the LC tank network 51 with an approximately square wave waveform signal having a magnitude of 160 V which is present at node 38.

This 2.6 MHz steady state operating frequency of the inverter circuit 11d is advantageous since it is so far above the highest undamped acoustic resonant frequency of the discharge tube 100, which may be as high as 300 kHz. Operating at a frequency well above this highest acoustic resonant frequency avoids undesirable bowing of the arc in the discharge tube 100. Such bowing of the arc is to be avoided as it may result in color shift of the discharge tube illumination, flicker of the illumination and/or fracturing of the discharge tube 100. Additionally, applying power to the discharge tube 100 at 2.6 MHz maintains the fundamental frequency within the 2.5–3.0 MHz frequency range which extends the limit on conducted EMI to 70 dB $\mu$V (0 dB=1 $\mu$V). The DC blocking capacitor 46 blocks the DC component of the output current. Operation of an electronic ballast circuit that includes an inverter circuit is disclosed in U.S. Pat. No. 5,917,289, issued on Jun. 29, 1999 to Louis R. Nerone et al. and assigned to the assignee of the present invention. U.S. Pat. No. 5,917,289 is hereby incorporated in its entirety by reference.

2) Hot Restart Operation

In the event that the power supplied by the AC power source 150 drops below the threshold level necessary to maintain the arc, the arc extinguishes and it is necessary to reignite the arc. As noted above, the discharge tube 100 heats up during operation and the break over voltage necessary to ignite the arc increases greatly with increasing discharge tube temperature. When the lamp 10 is hot, the break over voltage may far exceed 5 kV and in fact may be 30 kV or more. If the hot restart protection circuit 50 were not present, the inverter circuit 11d would attempt to drive an increasing AC voltage across the discharge tube electrodes 102, 104 to ignite the arc, ultimately overloading the capacity of the complementary MOSFET transistors 12, 22 and destroying the ballast circuit 10.

The hot restart protection circuit 50 advantageously operates to tune or limit the amplitude of the output voltage Vo that is applied by the inverter circuit 11d to the discharge tube 100 to approximately 2.0 kV (peak voltage). Additionally, the hot restart protection circuit 50 provides the output voltage as a series of 2.0 kV pulses having a short duration (about 50 $\mu$sec) with a period of approximately 1 second between pulse. The periodic 2.0 kV pulses are continued while the lamp is cooling until the arc is capable of being ignited by a 2.0 kV pulse and steady state operation (as described above) is thereby achieved.

The hot restart protection circuit 50 works as follows. When there is no arc in the discharge tube 100, the discharge tube acts as a high impedance. The hot restart protection circuit 50 is coupled across the 1.5 $\mu$H inductor 44 in the feedback path. During every 1 second period, for a time of 50 $\mu$sec, the hot restart protection circuit 50 is in a charging condition. During the charging condition, which has a duration of approximately 50 $\mu$sec, the hot restart protection circuit is equivalent to an open switch across the 1.5 $\mu$H inductor 44 and thereby permits the inverter circuit 11d in conjunction with the LC tank network 51 to operate near the resonant frequency of the LC tank network to apply a 2.0 kV pulse at 2.46 MHz across the discharge tube electrodes 102, 104. Recall that the amplitude of 2.0 kV of the output pulse is limited by the two 20 V Zener diodes 56, 58. If the discharge tube 100 has cooled sufficiently for an arc to be ignited by the 2.0 kV voltage pulse then ignition of the arc will occur. If the discharge tube 100 has not cooled sufficiently for an arc to be ignited, then the tube will continue to cool and another 2.0 kV pulse will be applied in approximately 1 second.

During the remainder of every 1 second period (1 second –50 $\mu$sec), the hot restart protection circuit operates as a closed switch or short circuit across the 1.5 $\mu$H inductor 44 and thereby forces the inverter circuit 11d to operate the LC tank network 51 higher than its resonant frequency thereby imposing a lower output voltage Vo across the discharge tube electrodes 102, 104. This low voltage cannot cause ignition of the arc and allows the tube to cool while also keeping the power dissipated in the inverter circuit components within safe limits.

Charging Condition of Hot Restart Protection Circuit

During 50 $\mu$sec charging time, the hot restart protection circuit 50 is an open switch across the 1.5 $\mu$H feedback path inductor 44. The AC feedback current through the secondary winding 45b charges the 1.0 $\mu$F capacitor 90 through the 100 $\Omega$ resistor 95 with an RC time constant of 100 $\mu$sec. The diodes 97, 98 and the intrinsic diodes associated with the turned off MOSFET transistors 62, 72 function as a full wave rectifier and charge the capacitor with the polarity shown in FIG. 1. During intervals where there is no arc in the discharge tube, approximately 20 V is present across the 1.5 µH inductor 44. Thus, in approximately 50 µsec the charge on the capacitor 90 charges to 10 V. During this 50 µsec duration, the output voltage Vo is has an amplitude of 2.0 kV and a frequency of 2.46 MHz.

Activation of Hot Restart Protection Circuit

When the charge on the capacitor 90 exceeds 10 V, the silicon switch 94 (having a 10 V break over voltage) turns on and some of the charge from the capacitor 90 is transferred to the 0.1 µF capacitor 86 through the switch 94. Since the value of the capacitor 86 is 1/10 the value of the capacitor 90, the capacitor 86 charges to about 8–9 V in about 60 µsec. When both capacitors 86 and 90 have the same voltage, approximately 8–9 V because of the 10:1 value difference between the capacitor, the current through the switch drops to near 0 A and the switch turns off.

When the charge on the capacitor 86 reaches approximately 8–9 V, the MOSFET transistors 62, 72 turn on and essentially provide a low impedance path in parallel with the 1.5 µH inductor 44. Turning on the MOSFET transistors 62, 72 shunts current away from the inductor 44 thereby changing the frequency of the inverter circuit 11d to approximately 3.0 MHz which is higher than its resonant frequency of 2.46 MHz. Forcing the LC tank network to operate at a frequency of 3.0 MHz effectively reduces the voltage output, Vo, across the discharge tube electrodes 102, 104 to a much lower value (approximately 100 V as is seen in the portions of the output voltage labeled 201a, 201b, 201c, 201d, 201e, 201f in FIG. 2.

When the voltage of the capacitor 86 falls below the threshold voltage of the MOSFET transistors 62, 72 (about 3 V on capacitor 86), the transistors 62, 72 turn off. This occurs approximately one second after turn on as the capacitor 86 discharges though the 10 MΩ resistor 88. The relatively slow discharge of the capacitor 86 from 8 V to 3 V is due to the 1 second time constant of the capacitor 86 and the resistor 88. When the voltage of the capacitor 86 drops to about 3 V, the transistors 62, 72 shut off and the current shunting effect of the hot restart protection circuit 50 with respect to the 1.5 µH inductor 44 ends. If no arc has been ignited in the discharge tube 100, the capacitor 90 begins its 50 µsec charging cycle to 10 V and the inverter circuit 11d returns to operating the circuit LC tank network 51 at 2.46 MHz and applies a 2.0 kV voltage pulse to the discharge tube electrodes 102, 104 as described in the charging condition section set forth above.

Stated another way, the way the hot restart protection circuit 50 changes the frequency of the inventer circuit 11d by periodically shunting current away from the 1.5 µH inductor 44. Since the inductor 44 is in series with the one turn secondary winding 45b which, in turn, is inductively coupled to the resonant LC tank network primary winding 45a, by shunting current away from the inductor 44, the phase angle of the gate driving voltage decreases causing the inverter circuit frequency to increase.

During steady state operation, that is, when there is an arc in the discharge tube 100, the hot restart protection circuit 50 is in a charging condition. However, since the discharge tube 100 provides a resistive load when the arc is present, the voltage present across the inductor 44 is not sufficiently high to charge the capacitor 90 to the break over voltage of 10 V required by the silicon switch to turn on and activate the hot restart protection circuit 50. Thus, the hot restart protection circuit 50 remains the equivalent of an open switch across the inductor 44 and the inverter circuit 11d operates at around 2.6 MHz, its steady state frequency.

Figure 2:
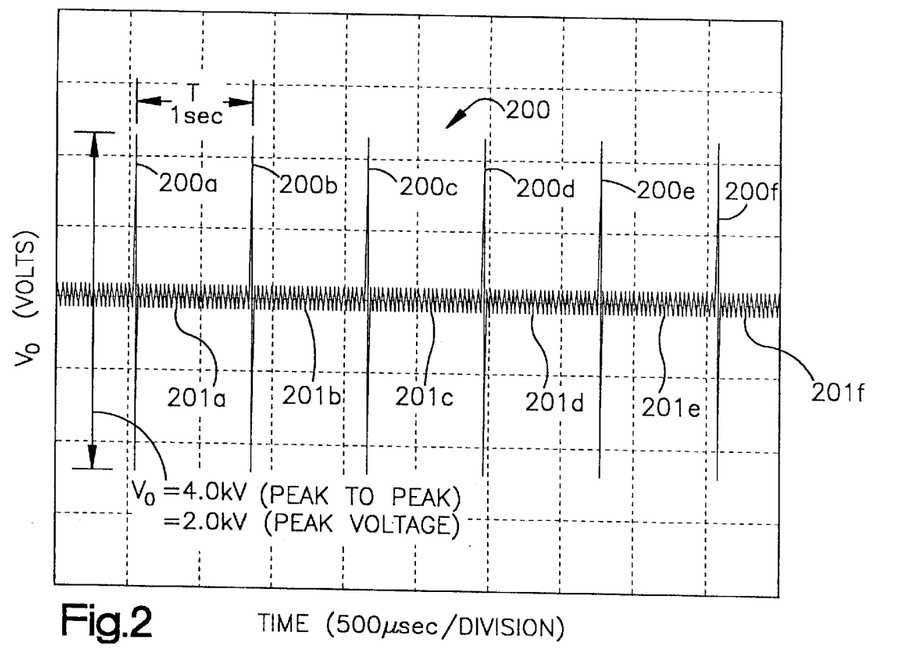
FIG. 2 is a schematic representation of a series of output voltage pulses generated by the electronic ballast of FIG. 1.
Figure 3:
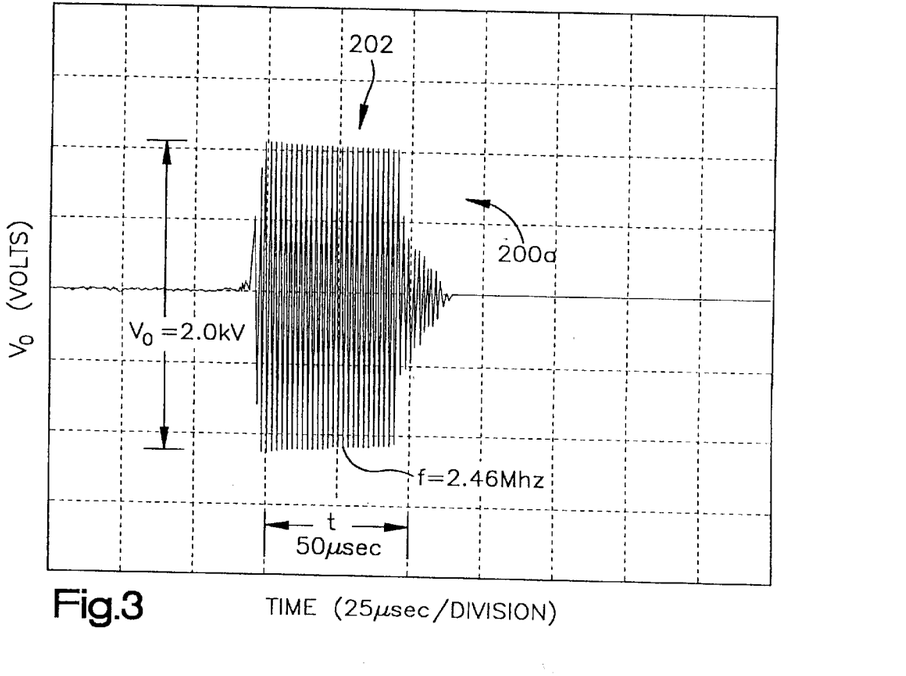
FIG. 3 is a schematic representation of one envelope of the series of output voltage pulses of FIG. 2.

FIG. 2 clearly illustrates the voltage pulsing effect of Vo achieved by the hot restart protection circuit 50. As can be seen Vo comprises a series of voltage pulses 200, specifically 200a, 200b, 200c, 200d, 200e, 200f that occur when the hot restart protection circuit 50 is in the charging condition. Each pulse 200 has a magnitude of 2.0 kV to 2.5 kV and a pulse duration, t, of approximately 50 µsec and a frequency of approximately 2.46 Hz. A period, T, between voltage pulses 200 is approximately 1 second. For the remainder of the time, that is, the times between the 50 µsec voltage pulses 200a, 200b, 200c, 200d, 200e, 200f, the output voltage Vo has an amplitude of approximately 100 V and a frequency of approximately 3.0 MHz. These in-between pulse times when the hot restart protection circuit 50 is in the discharging condition are labeled as 201a, 201b, 201c, 201d, 201e, 201f.

As the CMH lamp discharge tube 100 cools, the amplitude of the voltage necessary to ignite a discharge correspondingly drops. Depending on the specific characteristics of the discharge tube 100, the temperature of the tube at which a 2.0 kV pulse would be sufficient 5 to initiate a discharge would vary. If a 2.0 kV pulse initiates discharge in the discharge tube 100, the output voltage Vo across the discharge tube electrodes 102, 104 falls to around 50 V RMS initially because of the conduction through the discharge tube. This conduction through the discharge tube 100 effectively shuts off the hot restart protection circuit 50.

Advantageously, in the present invention, the duty cycle of the voltage pulses 200 is sufficiently low to avoid overheating of the components of the ballast 10 and, indeed, to permit cooling of the CMH lamp 100 if it is at a temperature above the critical value at which a 2.0 kV voltage pulse will initiate discharge in the discharge tube 100. Thus, if the CMH lamp 100 is at a temperature above the critical temperature, the ballast 10 will cause a 50 µsec voltage pulse 200 to be applied to the CMH lamp 100 every 1 second until such time as the lamp 100 cools to the critical temperature. When the CMH lamp 100 cool to or below the critical temperature, a voltage pulse 200 will ignite the lamp 100. Moreover, the amplitude of the voltage pulses 200 generated by the ballast 10 is limited to 2–2.5 kV thus avoiding failure of the inverter circuit 11d because of excessive power dissipation by the inverter circuit components. If the ballast 10 did not have voltage limitation, the voltage generated would rise to whatever level was necessary to ignite a discharge in the discharge tube 100. Under conditions where the discharge tube 100 was very hot, the voltage application necessary to ignite a discharge would be sufficient to cause failure of the inverter circuit 11d.

The voltage output Vo across the electrodes 102, 104 of the CMH lamp discharge tube 100 is schematically illustrated in FIGS. 2 and 3. FIG. 3 better illustrates the amplitude and frequency of a selected one of the series of output voltage pulses, namely 200a. The voltage pulse 200a has a magnitude of approximately 2.0 kV, a pulse duration, t, of approximately 50 µsec and a frequency of approximately 2.46 MHz. The pulse 200a may be viewed as a 50 µsec duration envelope comprised of a pulse train 202 of bipolar voltage waveforms having a frequency of approximately 2.46 MHz and a voltage range of 100 V to approximately 2 kV.

Second Preferred Embodiment of Electronic Ballast 10'

Figure 4:
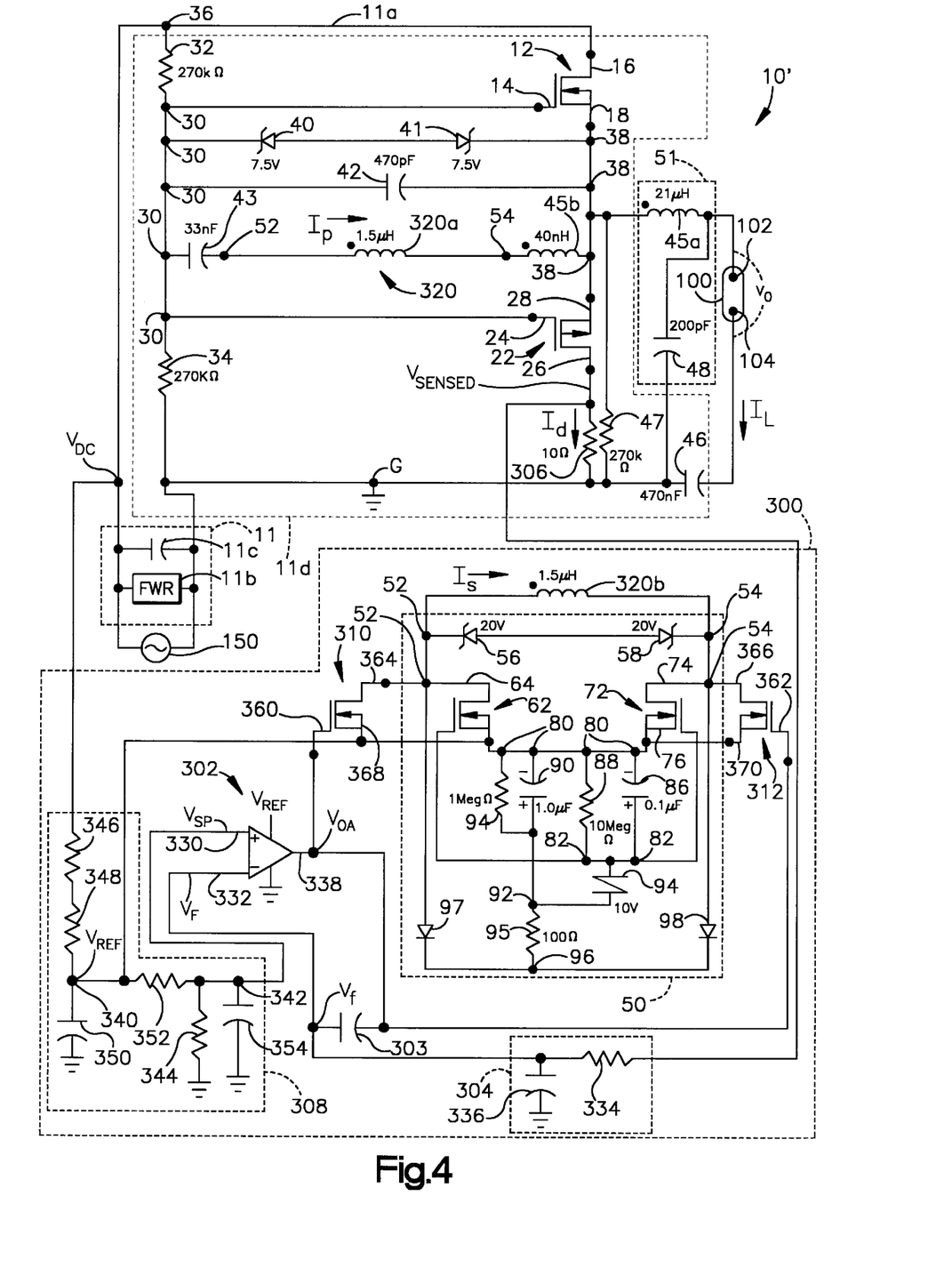
FIG. 4 is a second preferred embodiment of the electronic ballast of the present invention including power regulation circuitry.

A second preferred embodiment of an electronic ballast of the present invention is shown generally at 10' in FIG. 4.

This second embodiment of the electronic ballast 10' is similar in structure and function to the first preferred embodiment of the electronic ballast 10 described in detail above but additionally includes a power regulation function such that the power, P, applied to the CMH lamp 100 remains substantially constant despite changes in lamp resistance that occur during operation of the lamp. The components in the second embodiment electronic ballast 10' which are identical to the components of the first embodiment electronic ballast 10 have been assigned the same reference numbers as in the first embodiment and the description of those components and their functions will not be repeated in the interest of brevity.

As noted above, the additional novel feature of the electronic ballast 10' is the inclusion of power regulation circuitry 300 which functions to insure that the power P applied the CMH lamp 100 is substantially constant regardless of the lamp selected for use or any change in lamp resistance during operation. Because of normal variations that occur in the manufacturing process, different CMH lamps will have slightly different nominal (room temperature) resistances. Additionally, as a CMH lamp ages, its resistance will increase slightly. For a given CMH lamp 100, as the lamp heats up during operation, its resistance will decrease. A typical CMH lamp 100 having a nominal resistance of 600Ω may decrease resistance to about 400Ω during continuous operation. Because the power applied to a CMH lamp determines the color of the emitted light, it is highly desirable to apply a substantially constant power to a CMH lamp such that the color of emitted light is the same from lamp to lamp and, in addition, such that the color of emitted light for a given CMH lamp remains constant as the lamp heats up during operation.

Essentially, the power regulation circuitry 300 monitors the drain current, Id, through the complementary MOSFET transistor 22. A transformer 320 is used in place of the 1.5 μH coil 44 in the inverter circuit 11d, a primary winding 320a of the transformer 320 replaces the coil 44 and the secondary winding 320b of the transformer 320 is part of the power regulation circuitry 300. The secondary winding 320b is coupled between nodes 52, 54 of the hot restart protection circuit 50. Upon sensing a change in the current Id flowing through the complementary MOSFET transistors 12, 22, the current (labeled Is in FIG. 4) though the secondary winding 320b of the transformer 320 will change and, by inductive coupling, will change the current (labeled Ip in FIG. 4) though the primary winding 320b in the inverter circuit 11d.

By changing the current Ip through the primary winding 320a, the frequency of oscillation of the inverter circuit 11d will change. Since the inverter circuit excites or drives the LC tank network 51, changing the frequency of the inverter circuit 11d changing the voltage applied across the CMH lamp 100 by the LC tank network 51. Recall that the frequency of oscillation of the inverter circuit 11d is approximately 2.6 MHz and the resonant frequency of the LC tank network 51 driven by the inverter circuit 11d is 2.46 MHz. As was explained above with respect to the operation of the hot restart protection circuit 50, as the frequency of the inverter circuit 11d decreases from 2.6 MHz and more closely approaches the 2.46 MHz resonant frequency of the LC tank network 51, the voltage output by the LC tank network 51 increases. This is because the LC tank network 51 is being excited at a frequency that is closer to its resonant frequency and, therefore, the voltage applied across the lamp electrodes 102, 104 correspondingly increases. Conversely, as the frequency of the inverter circuit 11d increases above 2.6 MHz, that is, further away from the 2.46 MHz resonant frequency of the LC tank network, the voltage output by the LC tank network 51 decreases and, therefore, the voltage applied across the lamp 100 correspondingly decreases.

Upon a change in the resistance value of the CMH lamp 100, the current Id though the complementary MOSFET transistors 12, 22 will correspondingly change, that is, as the resistance of the lamp 100 decreases as the lamp 100 heats up during operation, the drain current Id through the transistors 12, 22 will increase. As the MOSFET drain current Id increases, the current, Is, through the secondary coil 320b correspondingly increases. As the current Is though the secondary coil 320b increases, the inductively coupled current, Ip, through primary coil 320a of the inverter circuit 11d also increases. Increasing the current Ip increases the phase angle and increases the frequency of oscillation of the inverter circuit 11d. Since the LC tank network 51 and the inverter circuit 11d are inductively coupled through primary and secondary coils 45a, 45b, increasing the frequency of oscillation of the inverter circuit 11d increases the excitation frequency of the LC tank network 51 and correspondingly decreases the voltage Vo applied across the lamp 100 by the LC tank network 51.

The power regulation circuitry 300 also functions to maintain substantially constant power P applied to the lamp 100 when the resistance of the lamp 100 increases, for example, if the lamp is turned off and cools, the lamp's resistance value increases. When the lamp 100 is then turned back on after cooling, the MOSFET drain current Id will be lower in magnitude than it was during hot operation and the current, Is, through the secondary coil 320b will be correspondingly lower. If the current Is though the secondary coil 320b is lower, the inductively coupled current, Ip, through primary coil 320a of the inverter circuit 11d also will be lower. Decreasing the current Ip decreases the phase angle and decreases the frequency of oscillation of the inverter circuit 11d. Decreasing the frequency of oscillation of the inverter circuit 11d decreases the excitation frequency of the LC tank network 51 toward the network's resonant frequency (2.45 MHz) and correspondingly increases the voltage Vo applied across the lamp 100 by the LC tank network 51.

Since the current Id though the complementary MOSFET transistors 12, 22 is the same as the current. $I_L$, through the lamp, the power regulation circuitry 300 effectively controls the power P applied to the lamp 100. That is, as Id and $I_L$ increase (because of a decrease in the resistance of the lamp), lamp voltage, Vo, is driven lower to maintain the lamp power P approximately constant and as Id and $I_L$ decrease (because of an increase in the resistance of the lamp), lamp voltage, Vo, is driven higher to maintain the lamp power P approximately constant.

The components of the power regulation circuitry 300 are shown generally within the dashed lines labeled 300 in FIG. 4 (not including the components of the hot restart protection circuit 50). The power regulation circuitry 300 includes an operational amplifier 302 configured as an integrating error amplifier having an 470 pF integrating capacitor 303 in the feedback loop of the amplifier 302. The power regulation circuitry 300 further includes a low pass filter 304 to filter out the AC component of a sensed inverter circuit output signal voltage, Vsensed, which typically oscillates at 2.6 MHz.

Another component of the power regulation circuitry 300 is a 10Ω sensor resistor 306 which senses the current Id flowing through the complementary MOSFET transistors 12, 22 of the inverter circuit 11d. The voltage signal, Vsensed, at the top of the resistor 302 (after filtering by low pass filter 304) is filtered by the low pass filter 304 to generate voltage signal, Vf, which is input to an inverting terminal 332 of the operational amplifier 302.

The power regulation circuitry 300 further includes a set point voltage circuit 308 for establishing a set point voltage, Vsp, to be input to a noninverting terminal 330 of the operational amplifier 302. Finally, the power regulation circuitry 300 includes a pair p channel MOSFET control transistors 310, 312 and the 1.5 $\mu$H secondary winding 320b coupled therebetween which is used to modify the frequency of oscillation of the inverter circuit 11d and thereby change the voltage, Vo, applied to the lamp 100 and, thereby, to control the power P applied to the lamp.

As noted above, the secondary winding 320b is inductively coupled to the primary winding 320a of the inverter circuit 11d, thus, the power regulation circuitry 300 (and the hot restart protection circuit 50) are electrically isolated from the inverter circuit 11d. Preferably, the windings ratio of the primary and secondary windings 320a 320b of the transformer 320 is 1:1.

The operational amplifier 302 is configured as an integrating error amplifier and has a set point voltage, Vsp, input to the noninverting input terminal 330 of the amplifier 302. The magnitude of the set point voltage, Vsp, determines the power applied to the lamp 100 since the amplifier 302 seeks to achieve a steady state condition wherein the voltage magnitude present at the noninverting terminal 303 equals the voltage magnitude present at the inverting terminal 332.

For example, assuming the set point voltage, Vsp, applied to the amplifier noninverting terminal 330 is set to 1 V DC, under steady state conditions, the voltage present at the inverting terminal 332 will also be 1 V DC. For 1 V to be present at the inverting terminal 332, there must be a corresponding 1 V DC voltage drop across the 10Ω sensor resistor 306. A 1 V DC voltage drop across the sensor resistor 306 would require the drain current, Id, flowing though the sensor resistor 306 to be 0.1 A or 100 mA, Id=1 V/10Ω=100 mA . Since the same current, Id, flowing through the sensor resistor 306 also flows through the lamp, $I_L$, the power P applied to the lamp 100 may be calculated.

For example, assuming the voltage $V_{DC}$ of the DC bus 11a is 150 V and the set point voltage is set at Vsp=1 V, and the drain current, Id=100 mA, the power applied to the lamp 100 is P=(150 V)(100 mA)=15 W. As can be seen from these calculations, changing the set point voltage, Vsp, would change the power applied to the lamp proportionately, e.g., Vsp=2 V would result in a sensor current Is=200 mA and power applied to the lamp P=30 W.

The 10Ω sensor resistor 306 is coupled between a drain terminal 26 of the inverter circuit MOSFET transistor 22 and the inverter circuit common or ground G. The voltage across the sensor resistor 306 includes an AC component having a frequency of the inverter circuit 11d, normally 2.6 MHz. The low pass filter 304 filters out the 2.5 MHz AC component of the inverter circuit output voltage Vsensed. The filtered feedback voltage signal, Vf, is coupled from the output of the low pass filter 304 to the inverting input terminal 332 of the error amplifier 302. The low pass filter comprises a 10 kΩ resistor 334 and a 1 $\mu$F capacitor 336 coupled to ground G.

The set point voltage circuit 308 establishes the set point voltage Vsp. The set point voltage circuit 308 is coupled to the DC bus line voltage, $V_{DC}$, and includes a resistor and capacitor network that results in a reference voltage, Vref, at node 340 used to power the operational amplifier 302 and the set point voltage Vsp at node 342. The set point voltage value Vsp may be adjusted to change the power P applied to the lamp 100. Assuming the power to be applied to the lamp is known, the value of the resistor 344 may be fixed. Suitable values for the set point voltage circuit 308 are as follows: a 20 kΩ resistor 344, a 47 kΩ resistor 346, a 47 kΩ resistor 348 and a 0.1 $\mu$F capacitor 350 coupled in series between the DC bus 11a and ground G; a 20 kΩ resistor 352 coupled between nodes 342 and 342 and a 0.1 $\mu$F capacitor 354 coupled between node 342 and ground G. Typical values of Vref and Vsp are Vref=5 V and Vsp=1 V.

The error amplifier 302 generates an output voltage, Voa, at its output terminal 228 proportional to a magnitude of the voltage difference is sensed between the noninverting and inverting terminals 330, 332, namely, the magnitude of the difference between Vsp and Vf. The output terminal 338 of the error amplifier 302 is coupled to the gate terminals 360, 362 of the pair of p channel MOSFET control transistors 310, 312. The secondary winding 320b is coupled between nodes 52, 54 of the hot restart protection circuit 50. The drain terminals 364, 366 of the control transistors 310, 312 are also coupled to the nodes 52, 54. The source terminals 368, 370 of the control transistors 310, 312 are coupled to the DC reference voltage, Vref, having a magnitude of about 5 V.

Operation of Power Regulation Circuitry

Under steady state conditions, that is, where the drain current Id is constant, the difference between the set point voltage and the filtered, sensed inverted circuit voltage, Vsp–Vf, at the operational amplifier noninverting and inverting terminals 330, 332 is essentially zero. This results in the operational amplifier having an output voltage, Voa, of essentially zero and the control transistors 310, 312 are both off. Under such conditions, the current Is through the secondary winding 320b is determined solely by the current Ip through the primary winding 320a. Under such conditions, the power regulation circuitry 300 has no effect on the frequency of oscillation of the inverter circuit 11d or the voltage applied the by LC tank network 51 to the lamp 100.

If the resistance of the lamp 100 decreases as would occur as the lamp heats up, the current Id (and $I_L$) will increase resulting in an increased filtered sensed voltage Vf at the operational amplifier inverting terminal 332. The increased filtered sensed voltage Vf will exceed he set point voltage Vsp applied to the noninverting terminal 330. The operational amplifier 302 will function as an error amplifier and the output voltage Voa at the output terminal 338 will change from essentially zero to a negative value proportional to the magnitude of the voltage difference between Vf and Vsp. The negative value of Voa will cause one of the control transistors 310, 312 to turn on and decrease the current Is through the secondary winding 320b.

Decreasing the current Is though the secondary winding 320b will proportionately decrease the current Ip through the primary winding 320a through inductive coupling. The decrease in current Ip will increase the frequency of oscillation of the inverter circuit 11d above 2.6 MHz and result in the LC tank network 51 being operated or driven further from its resonant frequency (2.46 MHz). Driving the tank network 51 at a higher frequency will decrease the output voltage Vo applied across the lamp 100. Thus, the increase in current $I_L$ through the lamp 100 resulting from decreased lamp resistance will be compensated for by decreased output voltage Vo such that power P applied to the lamp 100 remains approximately constant.

If the resistance of the lamp 100 increases as would occur if the lamp cooled (e.g., ambient temperature in vicinity of the lamp dropped), the current Id (and $I_L$) will decrease resulting in a decreased filtered sensed voltage Vf at the operational amplifier inverting terminal 332. The increased filtered sensed voltage Vf will fall below the set point voltage Vsp applied to the noninverting terminal 330. The operational amplifier 302 will function as an error amplifier and the output voltage Voa at the output terminal 338 will change from essentially zero to a positive value proportional to the magnitude of the voltage difference between Vf and Vsp. The negative value of Voa will cause the other of the control transistors 310, 312 to turn on and increase the current Is through the secondary winding 320b.

Increasing the current Is though the secondary winding 320b will proportionately increase the current Ip through the primary winding 320a through inductive coupling. The increase in current Ip will decrease the frequency of oscillation of the inverter circuit 11d below 2.6 MHz and result in the LC tank network 51 being operated or driven closer to its resonant frequency (2.46 MHz). Driving the tank network 51 at a lower frequency will increase the output voltage Vo applied across the lamp 100. Thus, the decrease in current $I_L$ through the lamp 100 resulting from increased lamp resistance will be compensated for by increased output voltage Vo such that power P applied to the lamp 100 remains approximately constant.

As a typical example, if lamp power P is desired to be 15 W and the lamp resistance varies from 400–600Ω during operation of the lamp, the power regulation circuity 300 will maintain lamp power P within a range of 13.5 to 16.5 W or +/−10% of desired power over the lamp resistance range of 400–600Ω. Without power regulation circuitry, the range of power P would typically be approximately 13.5 W to 19 W.

Third Preferred Embodiment of Electronic Ballast 10"

Figure 5:
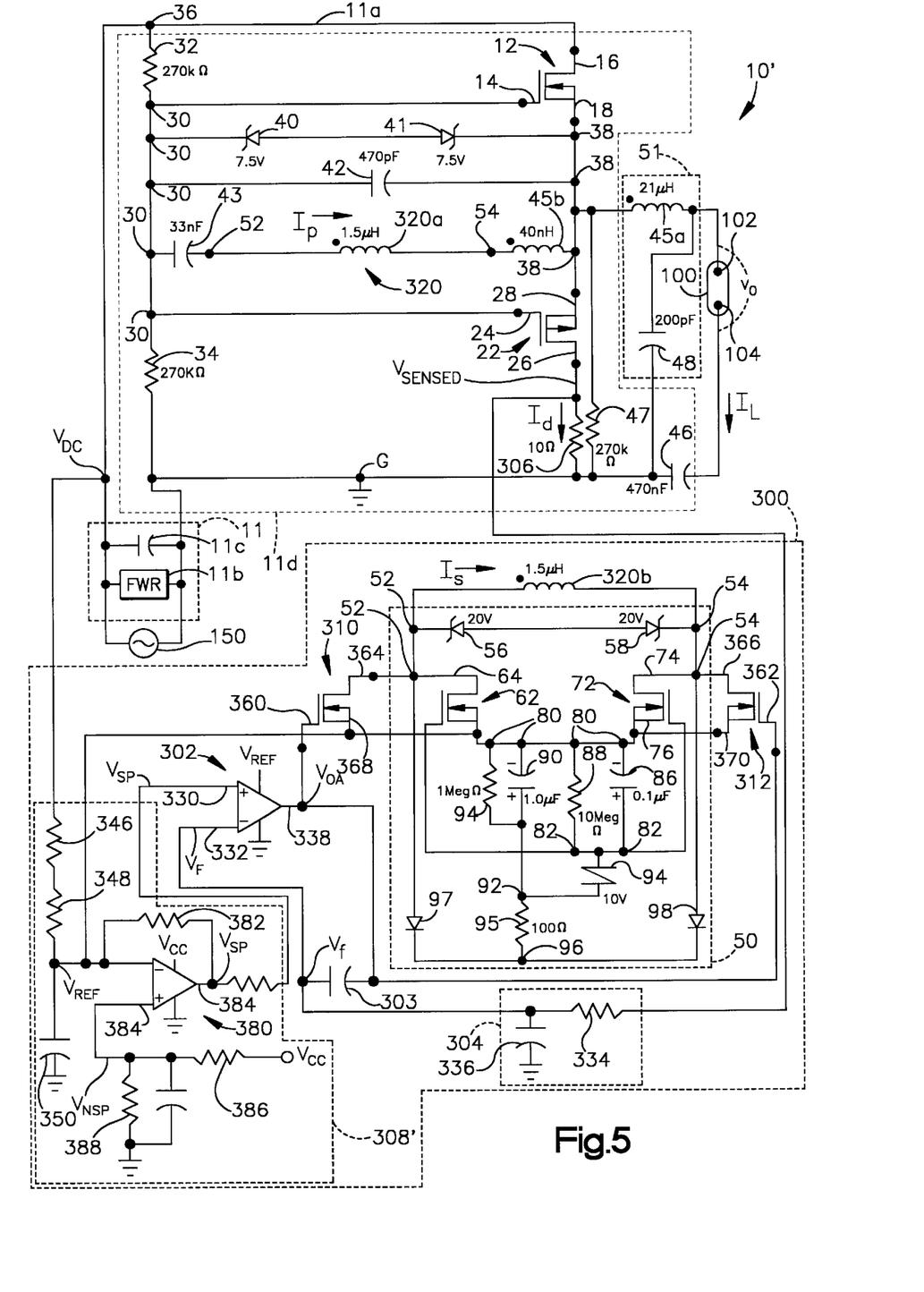
FIG. 5 is a third preferred embodiment of the electronic ballast of the present invention including an enhanced version of the power regulation circuitry of FIG. 4.

A third preferred embodiment of an electronic ballast of the present invention is shown generally at 10" in FIG. 5. This third embodiment of the electronic ballast is similar in structure and function to the second preferred embodiment of the electronic ballast 10' described in detail above. The components in the third embodiment electronic ballast 10" which are identical to the components of the first and/or second embodiments of the electronic ballast 10, 10' have been assigned the same reference numbers as in the first and/or second embodiments and the description of those components and their functions will not be repeated in the interest of brevity.

The power regulation circuitry 300' of the electronic ballast 10" is similar to the power regulation circuitry 300 of the electronic ballast 10' but the set point voltage circuit 308 of the second embodiment is modified is utilizing an operational amplifier 380 configured as a low voltage inverting amplifier which functions to change the set point voltage Vsp input to the noninverting terminal 330 of the operational amplifier 302 such that power P applied to the lamp 100 remains substantially constant in spite of any variations in the DC bus line voltage, $V_{DC}$, resulting from voltage variations of the AC voltage source 150, i.e., the AC power line voltage. While the power regulation circuit 300 represents a significant improvement in power regulation capability versus a ballast circuit without power regulation circuit, the power regulation circuitry 300' of the third embodiment further improves power regulation capability. As a typical example, if lamp power P is desired to be 15 W and the lamp resistance varies from 400–600Ω during operation of the lamp, the power regulation circuity 300' will maintain lamp power P within a range of 14.7 W to 15.3 W or +/−2% of desired power over the lamp resistance range of 400–600Ω.

The set point voltage circuit 308' of the third embodiment includes the operational amplifier 380 configured as a low voltage inverting amplifier with a 10 kΩ feedback resistor 382. The nominal set point voltage, Vnsp, present at the noninverting terminal 384 of the operational amplifier 380 is Vnsp=[(R388/(R388+R386)]×$V_{CC}$ where R388 is the resistance of the resistor 388, R386 is the resistance of the resistor 386, and $V_{CC}$ is a reference voltage of 5 V DC.

By superposition, the set point voltage, Vsp, generated at the output terminal of the operational amplifier 384 is computed as follows:

$$Vsp=[((R382+R346+R348)/(R346+R348))\times Vnsp]-[(R382/(R346+R348))\times V_{DC}]$$

where R382 is the resistance of the resistor 382, R346 is the resistance of the resistor 346, R348 is the resistance of the resistor 348, $V_{DC}$ is the DC voltage of the bus line 11a and Vnsp is the nominal set point voltage applied to the noninverting terminal 384. Typical resistance values for the resistors are: R386=20 kΩ, R388= 20 kΩ, R346=1.3 MΩ, R348=200 kΩ.

The set point voltage circuit 350' outputs a set point voltage, Vsp, that will vary with fluctuations in the voltage magnitude $V_{DC}$ of the DC bus line 11d such that power P applied to the lamp 100 will remain substantially constant even if the DC bus line voltage fluctuates because of variations in the voltage of the AC power line 110.

In the set point voltage circuit 350, a nominal set point voltage, Vnsp, is established by a voltage divider network comprising a constant DC voltage source, $V_{CC}$, e.g., $V_{CC}$= 5V and the pair of resistors 386, 388. The nominal set point voltage, Vnsp, is selected such that the desired lamp power P is achieved with the DC voltage $V_{DC}$ of the bus line 11a equal to the expected DC voltage magnitude when the AC voltage source 150 is providing the expected AC power line voltage.

While the preferred embodiment of the present invention has been described with a degree of particularity it is the intent that the invention include modifications from the disclosed design falling within the spirit or scope of the appended claims.

What is claimed is:

1. An electronic ballast for igniting and maintaining a discharge arc in a light emitting discharge tube, a resistance of the discharge tube varying with a temperature of the discharge tube during operation, the ballast comprising:

ballast circuitry including an oscillating inverter circuit for driving an LC tank network coupled to the discharge tube, the LC tank network applying a time varying voltage to the discharge tube, a peak-to-peak magnitude of the time varying voltage applied by the LC tank network being determined by a frequency of oscillation of the inverter circuit; and power regulation circuitry coupled to the inverter circuit to vary the frequency of oscillation of the inverter circuit such that power applied to the discharge tube remains within a range of a predetermined desired power magnitude while the discharge tube resistance varies with temperature during operation of the discharge arc, wherein the power regulation circuitry is inductively coupled to the inverter circuit through the use of a transformer and a primary winding of the transformer is coupled to the inverter circuit and a secondary winding of the transformer is coupled to the power regulation circuitry.

2. The electronic ballast of claim 1 wherein the range of the predetermined desired power magnitude of lamp power is in a range of +/−15% of the predetermined desired power magnitude.

3. The electronic ballast of claim 1 wherein the frequency of oscillation of the inverter circuit exceeds a resonant frequency of the LC tank network and as discharge tube resistance decreases, the power regulation circuitry increases the frequency of oscillation of the inverter circuit to decrease the peak-to-peak magnitude of the time varying voltage applied by the LC tank network to the discharge tube.

4. The electronic ballast of claim 3 wherein as discharge tube resistance increases, the power regulation circuitry decrease the frequency of oscillation of the inverter circuit to an oscillation frequency closer to the resonant frequency of the LC tank network thereby increasing the peak-to-peak magnitude of the time varying voltage applied by the LC tank network to the discharge tube.

5. The electronic ballast of claim 1 wherein the power regulation circuitry includes a first operational amplifier configured as an integrating error amplifier, a set point reference voltage being input to first input terminal of the operational amplifier and a sensed voltage of the inverter circuit being input to a second input terminal of the operational amplifier, the sensed voltage being proportional to a current through the discharge tube, an output voltage of the first operational amplifier being proportional to a voltage difference between the first and second input terminals, the frequency of oscillation of the inverter circuit being changed by changes in the operational amplifier output voltage.

6. The electronic ballast of claim 5 wherein the power regulation circuitry further includes a current sensing resistor coupled to the inverter circuit, the sensed voltage being the voltage drop across the current sensing resistor.

7. The electronic ballast of claim 5 wherein the first input terminal of the operational amplifier is a noninverting input terminal and the second input terminal of the operational amplifier is an inverting input.

8. The electronic ballast of claim 4 wherein the output voltage of the first operational amplifier is coupled to a secondary winding of a transformer and a primary winding of the transformer is coupled to the inverter circuit and further wherein changes in the first operational amplifier output voltage change a current in the transformer secondary winding and through inductive coupling correspondingly change a current in the transformer primary winding, the change in the current of the primary winding changing the frequency of oscillation of the inverter circuit.

9. The electronic ballast of claim 8 wherein the power regulation circuitry further includes a complementary pair of MOSFET control transistors whose respective gates are coupled to an output of the first operational amplifier and the transformer secondary winding is coupled between respective drain terminals of the control transistors, the control transistors switching off and on to control the current through the secondary winding.

10. The electronic ballast of claim 6 wherein the power regulation circuitry further a low pass RC filter to filter out an AC component of the voltage sensed across the current sensing resistor prior to inputting the sensed voltage to the second input terminal of the operational amplifier.

11. The electronic ballast of claim 5 wherein the power regulation circuitry further includes a set point reference voltage circuit that attenuates a DC voltage present on a DC bus line of the inverter circuit to generate the set point reference voltage.

12. The electronic ballast of claim 5 wherein the power regulation circuitry further includes a set point reference voltage circuit including a second operational amplifier configured as an inverting amplifier, an output voltage of the second operational amplifier being the set point reference voltage, a magnitude of the set point reference voltage varying with changes a DC voltage present on a DC bus line of the inverter circuit to compensate for changes in power applied to the discharge tube resulting from changes in the DC bus line voltage.

13. The electronic ballast of claim 12 wherein a nominal set point voltage value is input a noninverting input terminal of the second operational amplifier and an attenuated DC voltage proportional to the DC voltage present on a DC bus line is input to the inverting input terminal of the second operational amplifier.

14. The electronic ballast of claim 1 wherein the ballast circuitry includes rectification circuitry to convert an AC power source to a regulated DC voltage signal.

15. The electronic ballast of claim 1 wherein the inverter circuitry includes a pair of complementary MOSFET transistors to drive the LC tank network.

16. The electronic ballast of claim 1 wherein the ballast circuitry includes a hot restart protection circuit which periodically changes a frequency the inverter circuit between a first frequency value and a second frequency value, the hot restart protection circuit being activated to ignite a discharge arc in the light emitting discharge tube.

17. A method of maintaining a power applied to a light emitting discharge tube within a range of a predetermined desired power magnitude during maintenance of a discharge arc in the discharge tube given that a resistance of the discharge tube varies with temperature during operation of the discharge arc, the steps of the method comprising:

a) providing ballast circuitry including an oscillating inverter circuit for driving an LC tank network coupled to the discharge tube, the LC tank network applying a time varying voltage to the discharge tube to maintain the discharge arc, a peak-to-peak magnitude of the time varying voltage applied by the LC tank network being determined by a frequency of oscillation of the inverter circuit; and b) controlling the frequency of oscillation of the inverter circuit with power regulation circuitry inductively coupled to the inverter circuit, the power regulation circuitry varying the frequency of oscillation of the inverter circuit by controlling a current through a transformer winding coupled to the inverter circuit such that power applied to the discharge tube remains within the range of the predetermined desired power magnitude, wherein the power regulation circuitry is inductively coupled to the inverter circuit through the use of a transformer and a primary winding of the transformer is coupled to the inverter circuit and a secondary winding of the transformer is coupled to the power regulation circuitry.

18. The method of claim 17 of maintaining a power applied to a light emitting discharge tube within a range of a predetermined desired power magnitude wherein the frequency of oscillation of the inverter circuit exceeds a resonant frequency of the LC tank network and as discharge tube resistance decreases, the power regulation circuitry increases the frequency of oscillation of the inverter circuit to decrease the peak-to-peak magnitude of the time varying voltage applied by the LC tank network to the discharge tube.

19. An electronic ballast for igniting and maintaining a discharge arc in a light emitting discharge tube, a resistance of the discharge tube varying with a temperature of the discharge tube during operation, the ballast comprising:

ballast circuitry including an oscillating inverter circuit for driving an LC tank network coupled to the discharge tube, the LC tank network applying a time varying voltage to the discharge tube, a peak-to-peak magnitude of the time varying voltage applied by the LC tank network being determined by a frequency of oscillation of the inverter circuit; and power regulation circuitry coupled to the inverter circuit to vary the frequency of oscillation of the inverter circuit such that power applied to the discharge tube remains within a range of a predetermined desired power magnitude while the discharge tube resistance varies with temperature during operation of the discharge arc, wherein the frequency of oscillation of the inverter circuit exceeds a resonant frequency of the LC tank network and as discharge tube resistance decreases, the power regulation circuitry increases the frequency of oscillation of the inverter circuit to decrease the peak-to-peak magnitude of the time varying voltage applied by the LC tank network to the discharge tube.

20. The electronic ballast of claim 19 wherein as discharge tube resistance increases, the power regulation circuitry decrease the frequency of oscillation of the inverter circuit to an oscillation frequency closer to the resonant frequency of the LC tank network to increase the peak-to-peak magnitude of the time varying voltage applied by the LC tank network to the discharge tube.

21. The electronic ballast of claim 20 wherein the output voltage of the first operational amplifier is coupled to a secondary winding of a transformer and a primary winding of the transformer is coupled to the inverter circuit and further wherein changes in the first operational amplifier output voltage change a current in the transformer secondary winding and through inductive coupling correspondingly change a current in the transformer primary winding, the change in the current of the primary winding changing the frequency of oscillation of the inverter circuit.

22. The electronic ballast of claim 19 wherein the power regulation circuitry includes a first operational amplifier configured as an integrating error amplifier, a set point reference voltage being input to first input terminal of the operational amplifier and a sensed voltage of the inverter circuit being input to a second input terminal of the operational amplifier, the sensed voltage being proportional to a current through the discharge tube, an output voltage of the first operational amplifier being proportional to a voltage difference between the first and second input terminals, the frequency of oscillation of the inverter circuit being changed by changes in the operational amplifier output voltage.

23. A method of maintaining a power applied to a light emitting discharge tube within a range of a predetermined desired power magnitude during maintenance of a discharge arc in the discharge tube given that a resistance of the discharge tube varies with temperature during operation of the discharge arc, the steps of the method comprising:

a) providing ballast circuitry including an oscillating inverter circuit for driving an LC tank network coupled to the discharge tube, the LC tank network applying a time varying voltage to the discharge tube to maintain the discharge arc, a peak-to-peak magnitude of the time varying voltage applied by the LC tank network being determined by a frequency of oscillation of the inverter circuit; and b) controlling the frequency of oscillation of the inverter circuit with power regulation circuitry inductively coupled to the inverter circuit, the power regulation circuitry varying the frequency of oscillation of the inverter circuit by controlling a current through a transformer winding coupled to the inverter circuit such that power applied to the discharge tube remains within the range of the predetermined desired power, wherein the frequency of oscillation of the inverter circuit exceeds a resonant frequency of the LC tank network and as discharge tube resistance decreases, the power regulation circuitry increases the frequency of oscillation of the inverter circuit to decrease the peak-to-peak magnitude of the time varying voltage applied by the LC tank network to the discharge tube.

* * * * *